United States Patent [19]

Yamanari et al.

[11] Patent Number: 5,025,484

[45] Date of Patent: Jun. 18, 1991

[54] CHARACTER READER DEVICE

[75] Inventors: Masaya Yamanari; Masami Ikeda, both of Ohme, Japan

[73] Assignee: Kabushiki Kaisha Toshiba, Kawasaki, Japan

[21] Appl. No.: 232,189

[22] Filed: Aug. 15, 1988

[30] Foreign Application Priority Data

Dec. 11, 1987 [JP] Japan .................................. 62-314349

[51] Int. Cl.$^5$ .............................................. G06K 9/00
[52] U.S. Cl. ....................................... 382/61; 382/40; 382/57; 382/59; 340/721
[58] Field of Search ....................... 382/57, 40, 61, 59; 340/721

[56] References Cited

U.S. PATENT DOCUMENTS 4,674,065  6/1987  Lange et al. ........................... 382/40
4,817,185  3/1989  Yamaguchi et al. ................... 382/59
4,899,276  2/1990  Stadler ................................. 364/300

Primary Examiner—David K. Moore
Assistant Examiner—Dan Santos
Attorney, Agent, or Firm—Finnegan, Henderson, Farabow, Garrett and Dunner

[57] ABSTRACT

A character reader device of the present invention is capable of reading as read data characters written in a portion corresponding to a given read field on a manuscript, detecting a reject character in the read data, generating a pattern image corresponding to the reject character, displaying the read data, the reject character and the pattern image, computing the position of a display area for the read data, deciding whether or not the computed display area is overlapped with the display area for the pattern image shifting the pattern image to the area which is the outside of the display area for the read data if overlapped and displaying it on the latter area. The character reader device can therefore prevent a disadvantage in modifying the reject character if the display area for the pattern image of the reject character is overlapped with the display area for the read data of the read field including the reject field by shifting the display area for the pattern image to another area and modify the reject character more efficiently.

6 Claims, 4 Drawing Sheets (a)

(b)

| COORDI-NATE Y | COORDI-NATE X | NUMBER OF DISPLAY DIGITS | FIELD POINT |
|---|---|---|---|
|  |  |  |  |

CHARACTER READER DEVICE

The present application claims priority of Japanese Patent Application No. 62-314349 filed on Dec. 11, 1987.

FIELD OF THE INVENTION AND RELATED ART STATEMENT

The present invention relates to a character reader device.

Various fields of business, heretofore, have employed a character reader device, for optically scanning a manuscript, having a given read field for reading characters written in the field.

This type of character reader device (see FIG. 7) normally performs a reject process of specifying as a reject character 36, a character not achieving a given level of clearness by reading data 42 of a read field including the reject character 36, displaying on a given area 42 of a display screen 28 a pattern image 38 of the reject character 36, deciding a correct image of the reject character 36 (depending upon the comparison between the read data 40 and the pattern image 38) and modifying the reject character 36 into the correct image.

In general, this type of reject process required a system of displaying on the display screen 28 the read data in each read field including a reject character. More recently, however, for more accurate reading, the reject process has changed to a system of displaying on the screen the read data in all the read fields of a manuscript at a time.

The system of displaying on the screen the read data in all the read fields of a manuscript at a time may, however, overlap an area for displaying a given pattern image with an area for displaying the read field including a reject character. The overlapped area is hidden behind the display area of a pattern area, so that it is difficult to maintain the excellent condition in modifying a reject character.

OBJECT AND SUMMARY OF THE INVENTION

The present invention is designed to overcome the foregoing disadvantage, and it is an object of the present invention to provide a character reader device which serves to prevent the disadvantage in modifying a reject character which is caused when the area for displaying a pattern image of a reject character is overlapped with the area for displaying the read data of a read including the reject character in order to modify the reject character more efficiently.

The character reader device of the present invention comprises a reading means for reading as read data characters written in a given read field on a manuscript, a reject character-detecting means for detecting a reject character in the read data, a pattern image generating means for generating a pattern image of the reject character, a display means for displaying the read image, the reject character and the pattern image, a position computing means for computing the position of an area for displaying the read data on the display means, a decision means for deciding whether or not the area computed in the display means is overlapped with an area for displaying the pattern image on the display means and a pattern image shifting and displaying means for shifting the area for displaying the pattern image to the outside of the area for displaying the read data when the decision means decides it is overlapped, and therefore is capable of preventing a disadvantage in modifying a reject character when the area for displaying a pattern image of the reject character is overlapped with the area for displaying the read of the read field including the reject character by virtue of shifting the area for displaying the pattern image for the purpose of modifying the reject character more efficiently.

DETAILED DESCRIPTION OF THE PREFERRED EMBODIMENT

An embodiment of the present invention will be described below with reference to the drawings.

Figure 1:
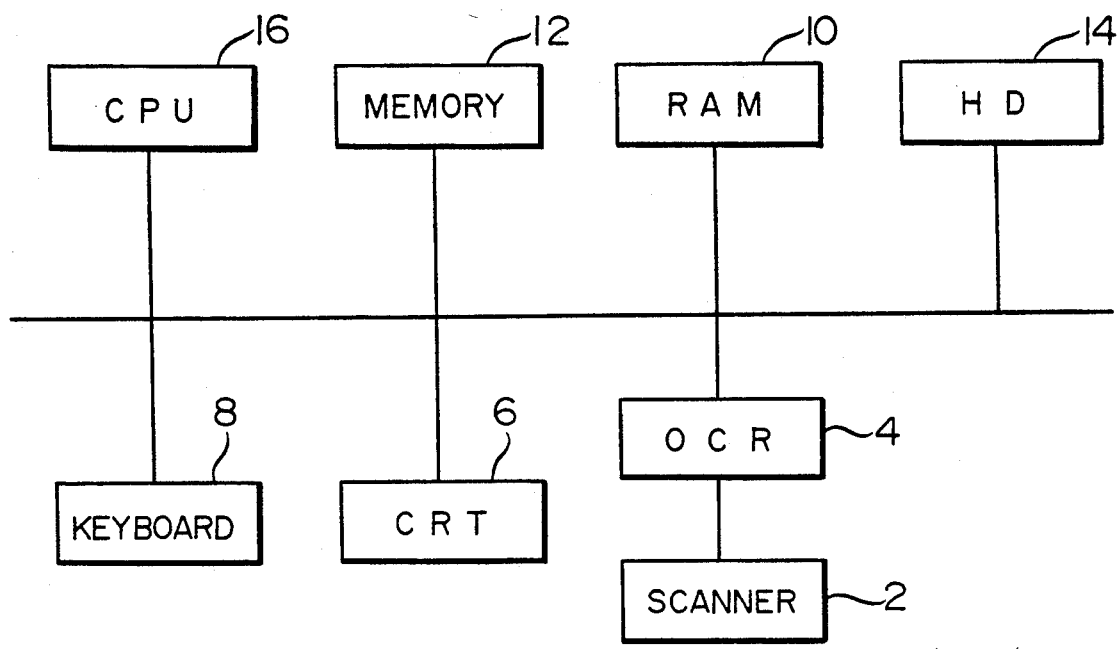
FIG. 1 is a block diagram for describing an arrangement of one embodiment of a character reader device according to the present invention.

FIG. 1 is a block diagram showing an arrangement of the character reader device of one embodiment according to the, present invention.

A scanner 2 optically scans a manuscript 24 with read fields set (see FIG. 4) line by line so as to obtain a character image signal corresponding to the read data of the manuscript. An OCR (Optical Character Reader) 4 temporarily saves the read data corresponding to one line of the manuscript 24 read by the scanner 2 and then cuts out the read data character by character. Then, the OCR 4 recognizes a character corresponding to the cut out data for obtaining a character code.

A CRT (Cathode Ray Tube) 6 includes a display screen 28 (see FIG. 5) for displaying the read data of all read fields of the manuscript 24 and a pattern image of a reject character, if a reject occurs during the character reading of the manuscript 24, on each given display area. A keyboard 8 is used for input to a character reader device.

A RAM (Random Access Memory) 10 temporarily stores the read data of the read field displayed on a given display area within the display screen 28 of the CRT 6 which has been already stored in a HD (Hard Disk) 14.

A memory 12 is provided with a given program for controlling the overall device. A CPU (Central Processing Unit) 16 controls the overall device in accordance with the given program stored in the memory 12.

The device disclosed according to this embodiment includes the program executed by the CPU 16 to perform for the reject process, which will be described later.

Figure 2:
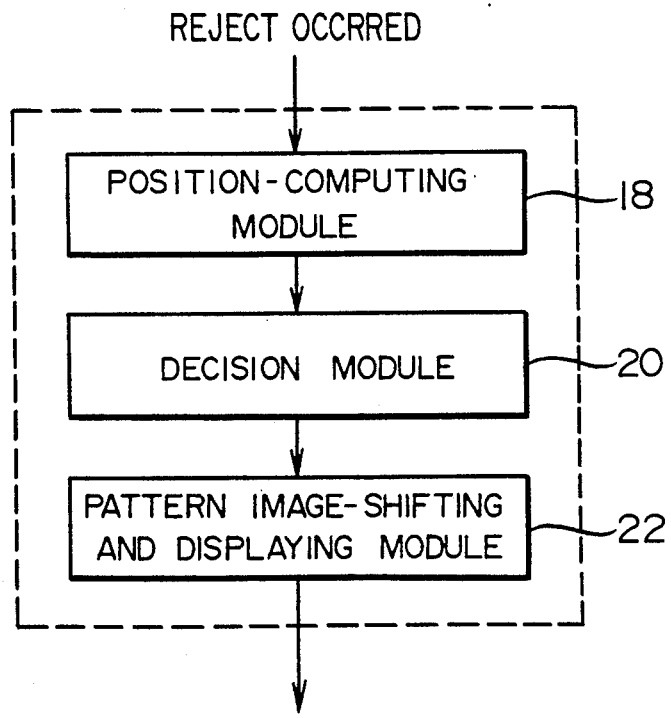
FIG. 2 is a view showing module arrangement of a control program used in case of the reject process in the character reader device shown in FIG. 1.

FIG. 2 is a view showing execution program arrangement for the reject process done in the device of the embodiment.

If a reject occurs, position computing module 18 computes the display position of the read field including the rejected character on the display screen. A decision module 20 decides whether or not the display area for the read data of the read field computed in the position computing module 18 is overlapped with a first display area for a pattern image of a reject character pre-defined on the program. A pattern image shifting and displaying module 22 shifts the pattern image of the reject character from the first display area to a second display area which is outside of the display area for the read data of a read field including a reject character if the decision module 20 decides it is overlapped.

Next, the operation of the device of this embodiment will be described with reference to FIGS. 3 through 6.

Figure 3:
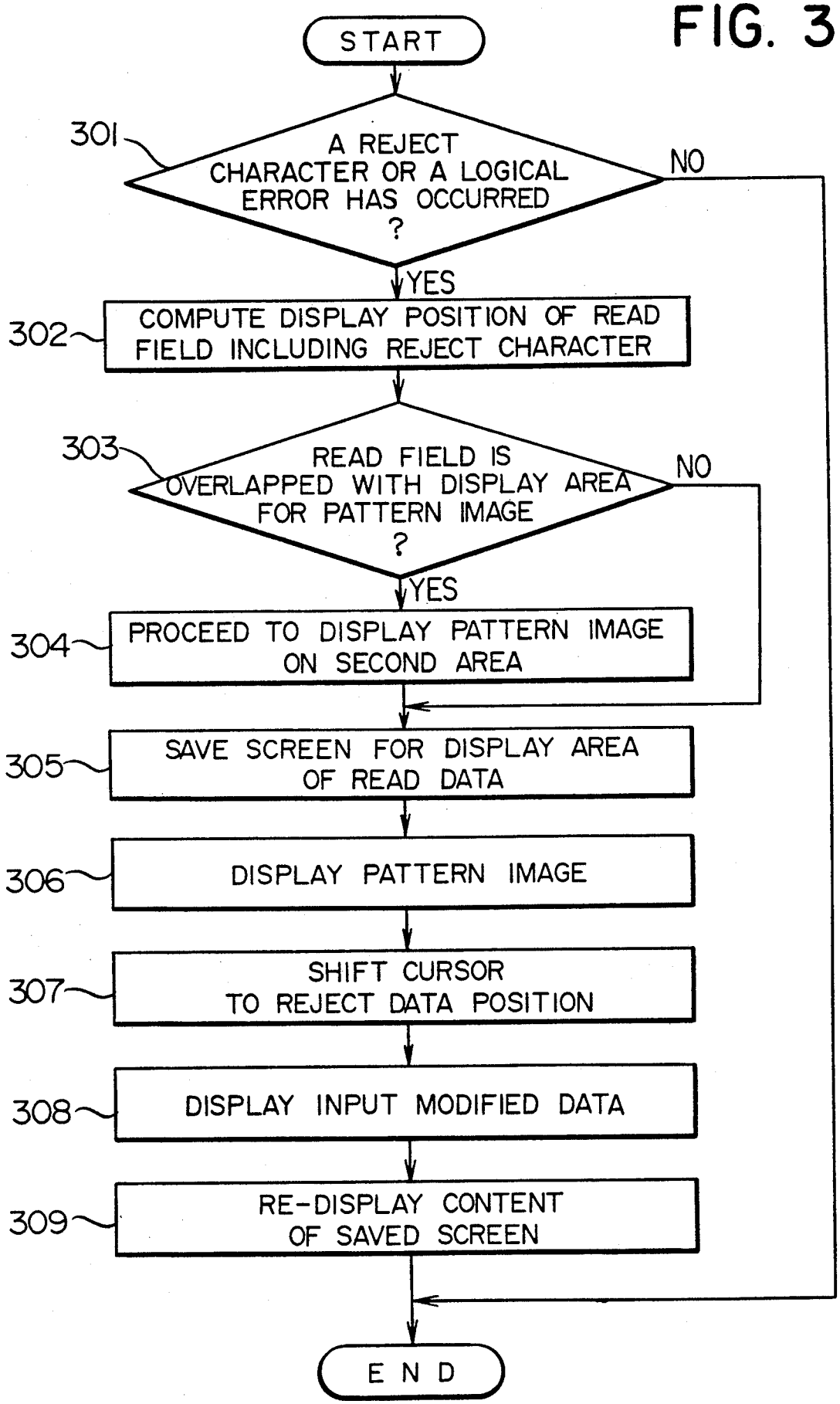
FIG. 3 is a flowchart showing the flow of the reject process in the character reader device shown in FIG. 1.
Figure 4:
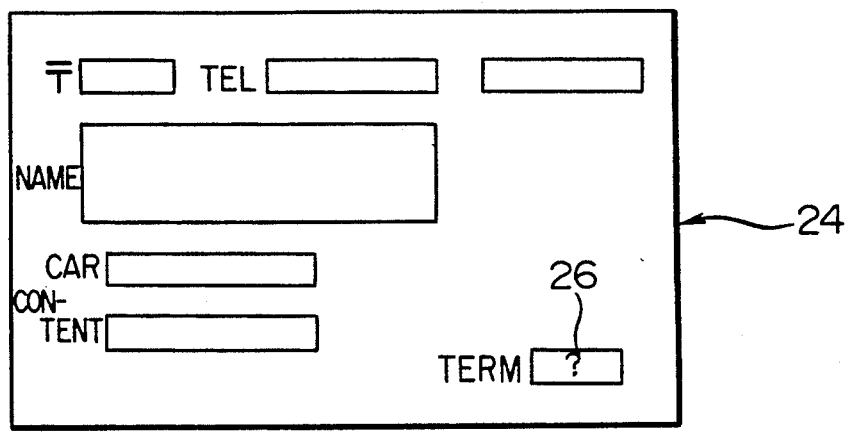
FIG. 4 is a plan view showing a manuscript.
Figure 5:
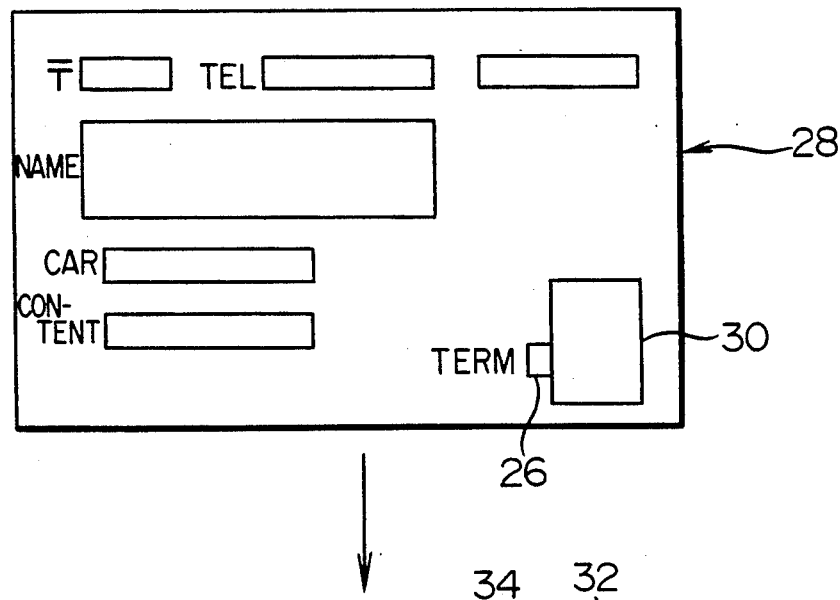
FIG. 5 (a) and (b) are plan views showing the change of a content displayed on a display screen by the reject process shown in FIG. 3.
Figure 5:
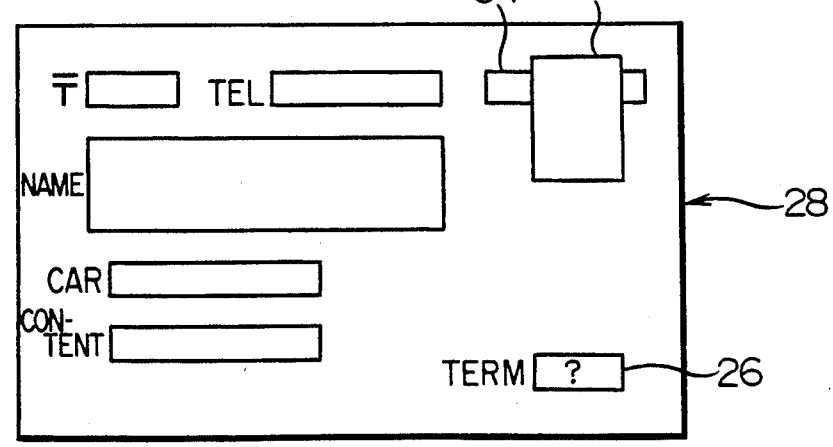

FIG. 3 is a flowchart showing the reject process done in the character reader device. FIG. 4 is a plan view showing the manuscript 24. FIGS. 5 (a) and (b) are views showing the change of the display screen 28 on the CRT 6 which change is done by the reject process shown in FIG. 3.

In this embodiment, the scanner 2 scans the manuscript 24 so as to obtain the read data (character image signal) of the characters in each read field on the manuscript 24. Then, the scanner 2 outputs the data to the OCR 4, which recognizes the characters one by one and generates character codes corresponding to the result of recognition.

Figures 6, 7:
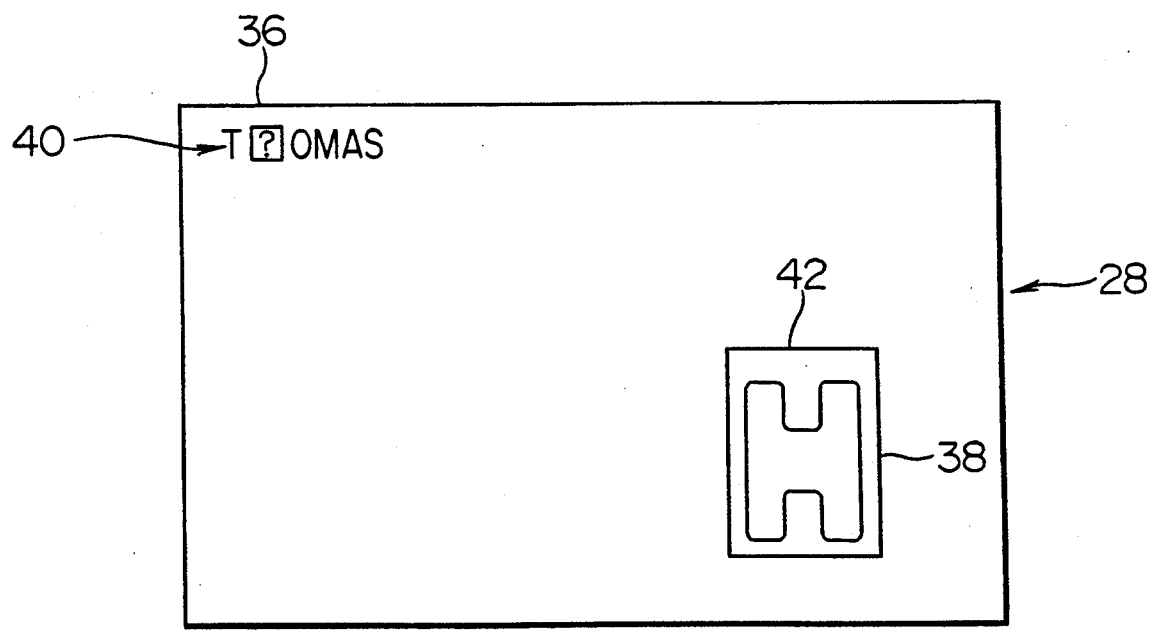
FIG. 6 is a view showing the information required to compute an area for displaying a read field.
FIG. 7 is a plan view showing the content of the display provided in excuting the conventional reject process.

If there occurs a logical error or a reject character in the read field 26 on the manuscript 24 (step 301), the CPU 16 computes the display position on the screen display 28 of the read field 26 including the reject character (step 302). The display position of the read field including a reject character can be, as shown in FIG. 6, computed on the basis of some factors such as an initial point coordinate (x/y coordinate) of the read field and the number of display digits, which are pre-defined on a format control table or computed immediately before reading the manuscript.

Next, the decision module 20 decodes whether or not the display position of the read field computed in the position computing module 18 overlaps with the present first display area 30 for a pattern image (step 303).

If the decision module 20 decides it is overlapped as shown in FIG. 5 (a), the CPU 16 commands the pattern image shifting and displaying modules 22 to shift the pattern image of the reject character to a second display area 32 which is outside of display area of the read field 26 (step 304). And, in order to secure the read data of a read field 34 which has been already displayed on the second display area 32 on the display screen 28, the read data is temporarily stored in the RAM 10 for saving the screen (step 305). Upon completion of saving the screen, the pattern image of the reject character is shifted and displayed on the second display area 32 (step 306).

Then, an operator should decide the correct data of the reject character by analyzing the read data of the read field 26 including the reject character with the pattern image of the reject character, moving the cursor to the position of the reject character on the display screen 28 using a keyboard 8 (step 307), and entering the modified data of the reject character for display of the input modified data (step 308). Finally, the reject process re-displays the read data of the read field 34 stored in the RAM 10 (step 309). This is the overall reject process.

Accordingly, the character reader device of this embodiment can shift the display area for a pattern image from the display area 30 to the area 32 on the display screen 28 if the display area 30 for a pattern image of a reject character is overlapped with the display area for the read data of the read field 26 including the reject character. The device, therefore, is capable of overcoming a disadvantage in modifying a reject character which disadvantage is caused if the display area 30 is overlapped with the display area for the read data of the read field 26 including a reject character and, thus modifying the reject character more efficiently.

In addition, the display area 32 to which the pattern image is shifted may be optionally modified in accordance with the kind of a manuscript.

What is claimed is:

1. A character reading apparatus for processing an input data sheet including character data, the character reading apparatus for use with a computer system including a display apparatus having a plurality of display areas including at least first and second display areas, the character reading apparatus comprising:
   scanner means for scanning the input data sheet and for producing an output image data corresponding to the input data sheet;
   character recognizing means for recognizing a character having a clarity of at least a predetermined level in the output image data;
   reject character detecting means for detecting a reject character having a level of clarity below the predetermined level in the output image data;
   pattern image generating means for reproducing a reject character image corresponding to the reject character;
   position computing means for computer a display position on the display apparatus in accordance with the recognized character and the reject character;
   display control means for displaying an image of each of the recognized character and the reject character in accordance with the display position from the position computer means, and for selectively displaying the reject character image in the first display area or the second display area;
   decision means for determining whether the displayed reject character overlaps the first display area; and
   shifting means for shifting the displayed reject character image to the second display area when the decision means determines that the displayed reject character overlaps the first display area.

2. The character reading apparatus according to claim 1, further comprising:
   storing means for temporarily storing the displayed recognized character when the displayed reject character overlaps the displayed recognized character in the second display area when the reject character image is shifted to the second display area.

3. The character reading apparatus according to claim 1, wherein the scanner means further comprises means for photoelectrically converting a scanned input data sheet.

4. A character reading apparatus for processing an input data sheet including character data, the character reading apparatus for use with a computer system including a display apparatus having a plurality of display areas including a default display area, the character reading apparatus comprising:

reading means for scanning the input data sheet, and for photoelectrically converting the scanned input data sheet;

image storing means for storing an output image data corresponding to the scanned input data sheet from the reading means;

character recognizing means for recognizing the output image data from the image storing means;

reject character detecting means for detecting a reject character and informing the character recognizing means not to recognize the reject character;

display control means for displaying the output image data from the character recognizing means, and for displaying in the default display area, the reject character from the reject character detecting means;

data modifying means for modifying the reject character; and decision means for determining whether the displayed reject character overlaps the displayed output image data requiring the data modification, and wherein the display control means displays the reject character in a display area other than the default display area when the decision means determines that the displayed reject character overlaps the displayed output image data requiring the data modification.

5. The character reading apparatus according to claim 4, further comprising image disposing means for extracting a specific area from the output image data in the image storing means, the specific area being an area comprising a character to be extracted.

6. The character reading apparatus according to claim 4, further comprising image disposing means for extracting a specific area from the output image data from the image storing means, the specific area being an area including a work having a character to be extracted.

* * * * *

UNITED STATES PATENT AND TRADEMARK OFFICE
CERTIFICATE OF CORRECTION

PATENT NO. : 5,025,484
DATED : June 18, 1991
INVENTOR(S) : Masaya Yamanari et al.

It is certified that error appears in the above-identified patent and that said Letters Patent is hereby corrected as shown below:

Claim 1, column 4, line 35, after "for" change "computer" to --computing--.

Claim 1, column 4, line 43, Before "means" change "computer" to --computing--.

Claim 6, column 6, line 19, change "work" to --word--.

Signed and Sealed this

Fifteenth Day of June, 1993

Attest:

MICHAEL K. KIRK

Attesting Officer

Acting Commissioner of Patents and Trademarks